US012674923B2

(12) United States Patent
Ishimaru et al.

(10) Patent No.: US 12,674,923 B2
(45) Date of Patent: Jul. 7, 2026

(54) OPTICAL FILM AND DISPLAY DEVICE

(71) Applicant: TOPPAN INC., Tokyo (JP)

(72) Inventors: Yoshiko Ishimaru, Tokyo (JP); Kai Futamata, Tokyo (JP)

(73) Assignee: TOPPAN INC., Tokyo (JP)

(*) Notice: Subject to any disclaimer, the term of this patent is extended or adjusted under 35 U.S.C. 154(b) by 408 days.

(21) Appl. No.: 18/354,568

(22) Filed: Jul. 18, 2023

(65) Prior Publication Data

US 2023/0358932 A1 Nov. 9, 2023

Related U.S. Application Data

(63) Continuation of application No. PCT/JP2021/026611, filed on Jul. 15, 2021.

(30) Foreign Application Priority Data

Jan. 19, 2021 (JP) ................................ 2021-006751

(51) Int. Cl.
*G02B 5/20* (2006.01)
*B32B 7/023* (2019.01)
(Continued)

(52) U.S. Cl.
CPC .............. *G02B 5/208* (2013.01); *B32B 7/023* (2019.01); *G02B 1/12* (2013.01); *G02B 5/28* (2013.01);
(Continued)

(58) Field of Classification Search
CPC .. G02B 5/02; G02B 1/115; G02B 1/14; B32B 7/023; B32B 2307/4026; B32B 2551/00
(Continued)

(56) References Cited

U.S. PATENT DOCUMENTS 6,307,671 B1 * 10/2001 Yabuki .................... G02B 5/201 252/588
2002/0025425 A1 * 2/2002 Kawazu ................ C03C 17/008 428/323
(Continued)

FOREIGN PATENT DOCUMENTS

JP H11-231301 A 8/1999
JP 2001-147319 A 5/2001
(Continued)

OTHER PUBLICATIONS

Omnirad 907 Photoinitiator. Datasheet [online]. iGM Resins, 2017 [retrieved on Oct. 27, 2025]. Retrieved from the Internet: <URL: https://www.penpoly.com/app/uploads/2021/07/Omnirad-907_tds.pdf>. (Year: 2017).*

(Continued)

*Primary Examiner* — Bumsuk Won
*Assistant Examiner* — Seth D Moser
(74) *Attorney, Agent, or Firm* — Foley & Lardner LLP

(57) ABSTRACT

An optical film includes a transparent substrate having opposite first and second surfaces, a colored layer formed to face the first surface of the substrate, and an optical function layer. A colorant in the colored layer contains at least one of a first coloring material having a maximum absorption wavelength in a range of 470 to 530 nm and an absorption spectral half width of 15 to 45 nm, a second coloring material having a maximum absorption wavelength in a range of 560 to 620 nm and an absorption spectral half width of 15 to 55 nm, and a third coloring material having the lowest transmittance in a wavelength range of 400 to 800 nm is in a range of 650 to 800 nm. A transmittance in one of the absorption wavelength bands of the colorant is 1% or more and less than 50%, and ΔE*ab.

13 Claims, 3 Drawing Sheets

(51) Int. Cl.
*G02B 1/12* (2006.01)
*G02B 5/28* (2006.01)

(52) U.S. Cl.
CPC ... *B32B 2307/4026* (2013.01); *B32B 2551/00* (2013.01)

(58) Field of Classification Search
USPC ............... 359/577, 580, 589, 590, 359, 614; 252/582, 586
See application file for complete search history.

(56) References Cited

U.S. PATENT DOCUMENTS

| | | | | |
|---|---|---|---|---|
| 2005/0046321 A1* | 3/2005 | Suga | G02B 6/0051 | 313/112 |
| 2006/0286381 A1* | 12/2006 | Naito | G02B 1/11 | 428/411.1 |
| 2010/0103355 A1* | 4/2010 | Sakamoto | G02F 1/133509 | 428/1.31 |
| 2021/0317304 A1* | 10/2021 | Hatta | B32B 27/288 | |
| 2025/0089549 A1* | 3/2025 | Tagami | G02B 5/22 | |

FOREIGN PATENT DOCUMENTS

| | | | | |
|---|---|---|---|---|
| JP | 2003-315544 | A | | 11/2003 |
| JP | 2007-226239 | | | 9/2007 |
| JP | 2008-083597 | A | | 4/2008 |
| JP | 2008-102340 | A | | 5/2008 |
| JP | 2009-031733 | A | | 2/2009 |
| JP | 2011141356 | A | * | 7/2011 |
| JP | 2012-118305 | A | | 6/2012 |
| JP | 2016-126064 | A | | 7/2016 |
| JP | 6142398 | B | | 6/2017 |
| JP | 2018136361 | A | * | 8/2018 |
| JP | 2019-008294 | A | | 1/2019 |
| JP | 2019-056865 | A | | 4/2019 |
| KR | 10-2019-0109988 | A | | 9/2019 |
| WO | WO-2005/022212 | A1 | | 3/2005 |

OTHER PUBLICATIONS

International Search Report and Written Opinion issued in connection with PCT Appl. Ser. No. PCT/JP2021/026611 dated Sep. 7, 2021.

Office Action issued in connection with Japanese Appl. No. 2022-576952 dated Jun. 27, 2023.

European Extended Search Report issued in corresponding European Patent Application No. 21921112.5 dated Oct. 15, 2024 (11 pages).

Office Action issued in corresponding Japanese Patent Application No. 2022-576952 dated Oct. 24, 2023 (11 pages).

Office Action issued in corresponding Korean Patent Application No. 10-2023-7020800 dated Jan. 16, 2026.

* cited by examiner

OPTICAL FILM AND DISPLAY DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/026611, filed on Jul. 15, 2021, which in turn claims the benefit of JP 2021-006751, filed Jan. 19, 2021, the disclosures of which are all incorporated herein by reference in its entirety.

TECHNICAL FIELD

The present invention relates to an optical film and a display device.

BACKGROUND

Background Art

To improve the color purity of a display device, there is a known method of using a color filter to separate or correct white light or monochromatic light emitted from a light source of a display device to narrow a full width at half maximum.

For improving color purity by a color filter, it is necessary to increase the concentration of a coloring material and thicken the filter. High coloring material concentrations, however, may degrade photolithographic properties. Thickening a filter sometimes causes deterioration of pixel shapes and viewing angle properties.

Furthermore, a color filter which improved color purity is generally low in transmittance and likely to lower luminance efficiency.

In view of the above, a method of improving color purity without using a color filter is proposed.

PTL 1 discloses a display filter in which a color correction layer is disposed on a filter base having an anti-reflection layer and an electromagnetic wave shielding layer. This display filter has a structure in which a color correction layer is disposed to an anti-reflection film. Therefore, a photolithography process is not necessary for manufacture, and luminance efficiency is unlikely to decrease.

PTL 2 discloses a coloring material suitable for a color correction layer.

[Citation List][Patent Literature][PTL 1] JP 2007-226239 A; [PTL 2] JP 6142398 B.

SUMMARY OF THE INVENTION

Summary of the Invention

Technical Problem

A functional colorant contained in a coloring material used in a color correction layer is often not high in light resistance, heat resistance, and moist heat resistance. Therefore, in a display filter including such a functional colorant, the function of the functional colorant can decrease with use, leading to a failure to sufficiently exert the color correction function.

The inventors conducted research on the solution of this problem and accomplished the present invention.

An object of the present invention is to provide an optical film that has a good color correction function and can withstand long-term use.

Solution to Problem

For solving the above-described problem, an optical film according to a first aspect of the present invention includes:

a sheet-like transparent substrate having a first surface and a second surface opposite the first surface;

a colored layer that is formed to face the first surface of the transparent substrate and contains a colorant; and an optical function layer formed on the colored layer, wherein the colorant contains at least one of a first coloring material having a maximum absorption wavelength in a range of 470 to 530 nm and an absorption spectral half width of 15 to 45 nm, a second coloring material having a maximum absorption wavelength in a range of 560 to 620 nm and an absorption spectral half width of 15 to 55 nm, and a third coloring material in which a wavelength having the lowest transmittance in a wavelength range of 400 to 800 nm is in a range of 650 to 800 nm, in one of absorption wavelength bands of the colorant, a transmittance is 1% or more and less than 50%, the optical function layer includes a layer that has an ultraviolet shielding rate according to JIS L 1925 of 85% or more and a pencil hardness at a surface load of 500 g of H or above, and ΔE*ab, which is a chromaticity difference between before and after a light resistance test of irradiating for 120 hours with a xenon lamp having an illuminance at wavelengths of 300 to 400 nm of 60 $W/cm^2$ under the conditions of a temperature of 45° C. and a humidity of 50% RH, satisfies Equation (1) below:

$$\Delta E^*ab \leq 5 \quad \text{Equation (1).}$$

A display device according to a second aspect of the present invention includes:

a light source; and the optical film according to the first aspect disposed in such a manner that the second surface of the transparent substrate faces the light source.

Advantageous Effects of the Invention

According to the above-described aspects of the present invention, there can be provided: an optical film that has a good color correction function and can withstand long-term use; and a display device including the optical film.

BRIEF DESCRIPTION OF THE DRAWINGS

Brief Description of the Drawings

Figure 1:
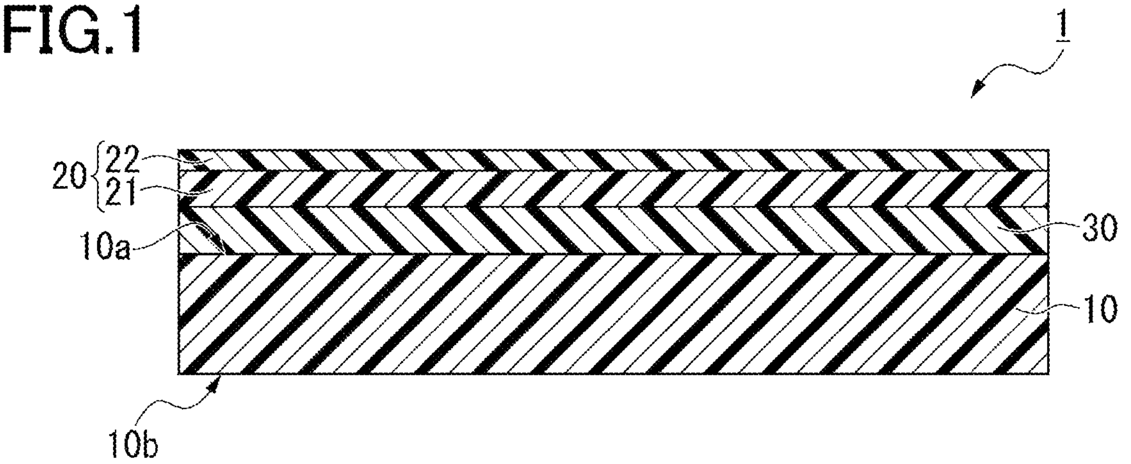

FIG. 1 is a schematic cross-sectional view of an optical film 1 according to a first embodiment of the present invention.

Figure 2:
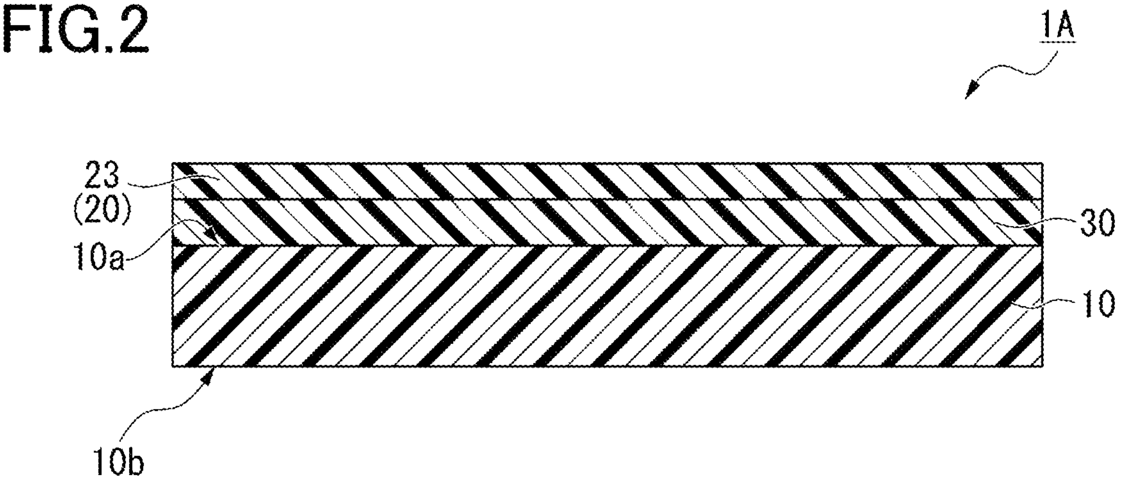

FIG. 2 is a schematic cross-sectional view of an optical film 1A according to a second embodiment of the present invention.

Figure 3:
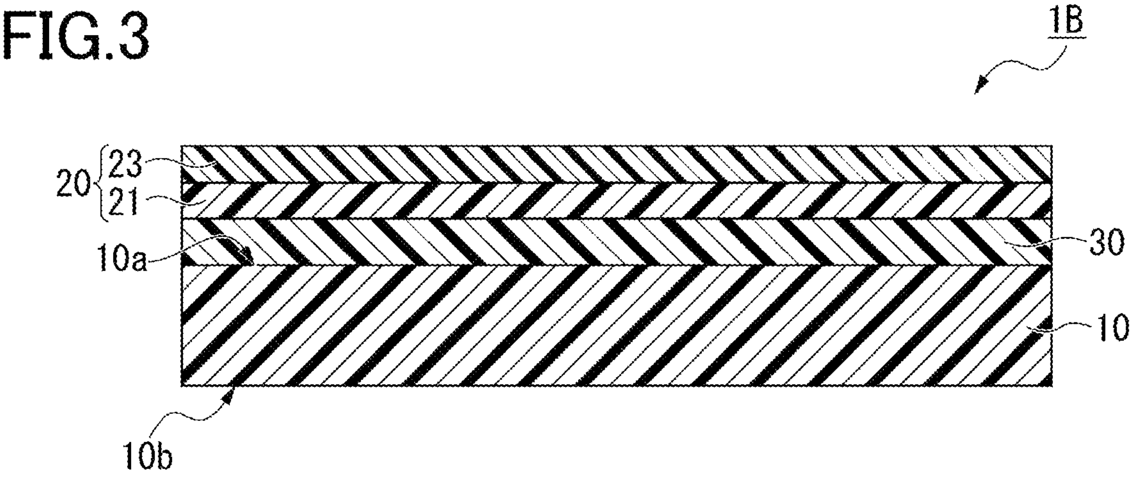

FIG. 3 is a schematic cross-sectional view of an optical film 1B according to a third embodiment of the present invention.

Figure 4:
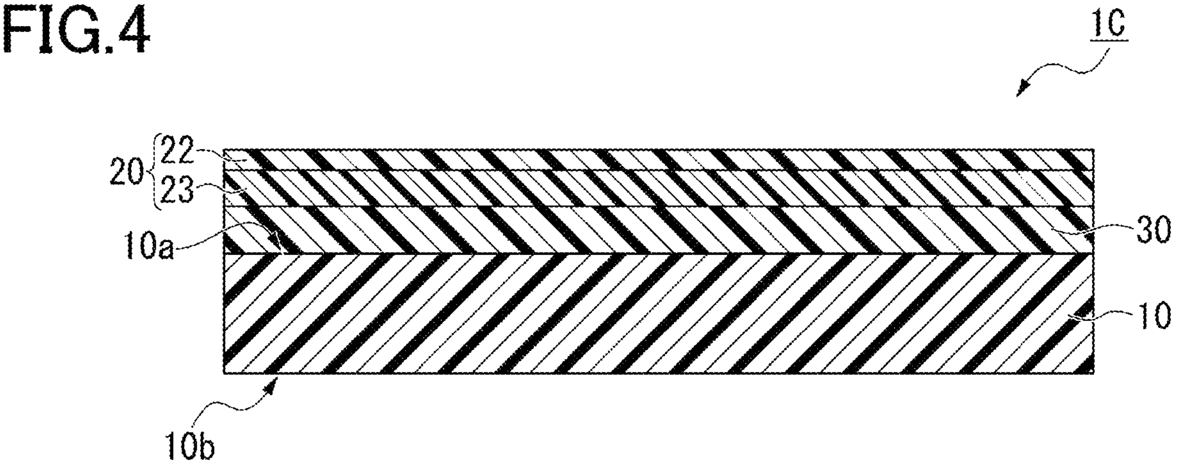

FIG. 4 is a schematic cross-sectional view of an optical film 1C according to a fourth embodiment of the present invention.

Figure 5:
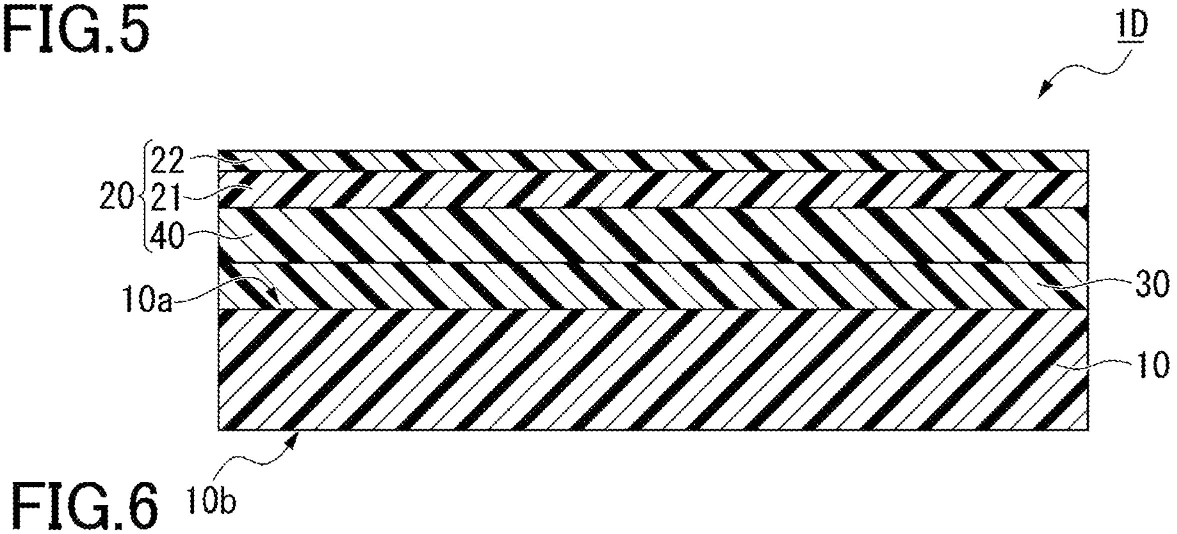

FIG. 5 is a schematic cross-sectional view of an optical film 1D according to a fifth embodiment of the present invention.

Figure 6:
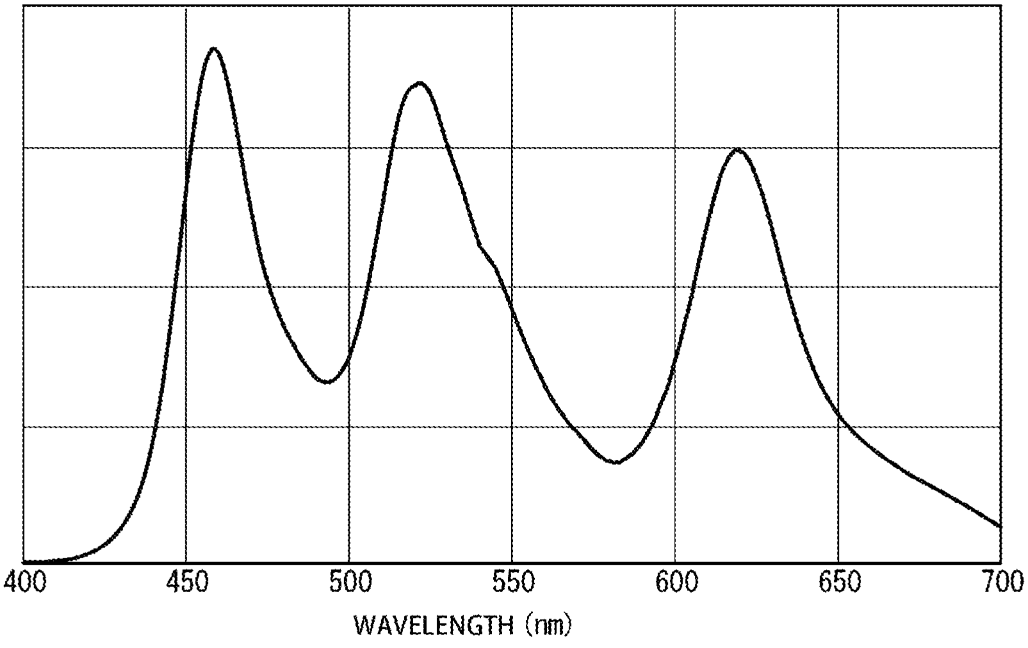

FIG. 6 shows a spectrum of a light source used in evaluation on transmission characteristics.

Figure 7:
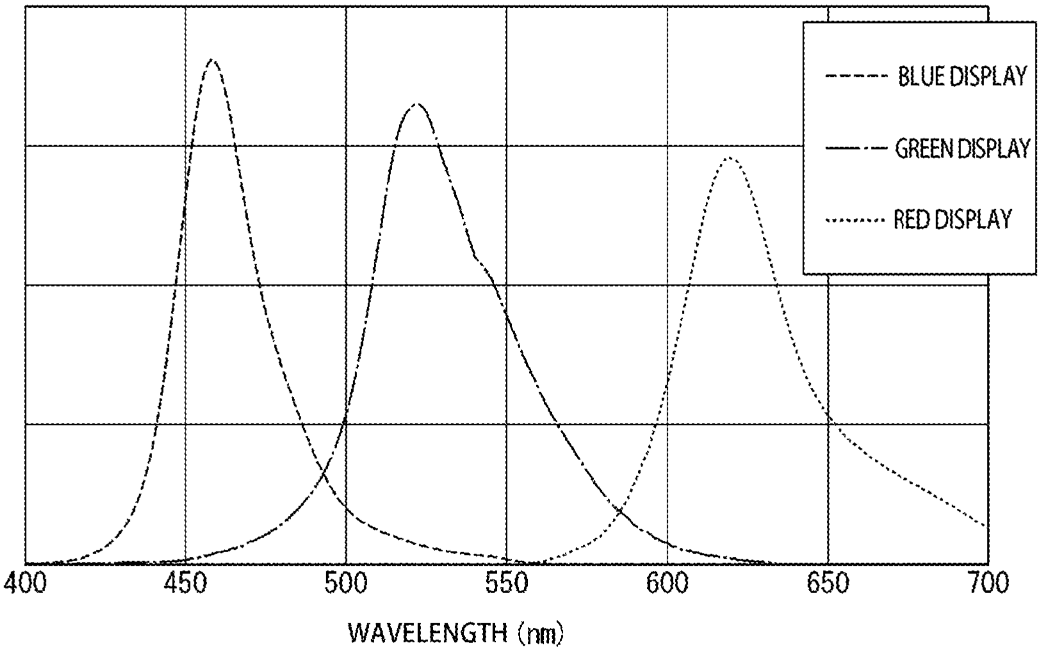

FIG. 7 shows spectrums of light sources used in evaluation on color reproducibility.

DESCRIPTION OF THE EMBODIMENTS

FIG. 1 to FIG. 5 are schematic cross-sectional views of optical sheets 1 and 1A to 1D according to first to fifth embodiments of the present invention, respectively. In FIG. 1 to FIG. 5, the upper side corresponds to an observer side when a display image on a display device is observed. Hereinafter, the first embodiment of the present invention will be described with reference to FIG. 1.

First Embodiment

FIG. 1 is a schematic cross-sectional view of an optical film 1 according to the present embodiment. The optical film 1 includes: a sheet-like transparent substrate 10; a colored layer 30 that is formed on a first surface 10*a* side of the transparent substrate 10 and contains a colorant; and an optical function layer 20 formed on the colored layer 30. Hereinafter, the transparent substrate 10 is sometimes merely referred to as the substrate 10.

In the present embodiment, a direction in which the substrate 10, the colored layer 30, and the optical function layer 20 are laminated is referred to as a thickness direction, one side in the thickness direction (an observer side when a display image on a display device is observed) is referred to as an upper side, and a side opposite the upper side is referred to as a lower side.

The substrate 10 is formed with a material having excellent transmissivity to visible light. Examples of a usable material for forming the substrate 10 include polyolefins such as polyethylene and polypropylene, polyesters such as polyethylene terephthalate, polybutylene terephthalate, and polyethylene naphthalate, polyacrylates such as polymethyl methacrylate, polyamides such as nylon 6 and nylon 66, transparent resins such as polyimide, polyarylate, polycarbonate, triacetyl cellulose, polyacrylate, polyvinyl alcohol, polyvinyl chloride, cycloolefin copolymers, norbornene-containing resins, polyether sulfones, and polysulfones, and inorganic glasses. Among these, a film formed of polyethylene terephthalate (PET), a film formed of triacetyl cellulose (TAC), a film formed of polymethyl methacrylate (PMMA), and a film formed of polyester can be suitably used. The thickness of the substrate 10 is not particularly limited but preferably 10 to 100 m.

The colored layer 30 contains a colorant for selectively absorbing a wavelength band of visible light. The colored layer 30 may have a structure in which a colorant is contained in a base resin constituted by an active energy ray-curing resin.

The colorant contains at least one from the group of three types of coloring materials including first to third coloring materials described below. The number of types of coloring materials to be contained is not limited to one, and two or more types of coloring materials may be contained.

The first coloring material has a maximum absorption wavelength in a range of 470 nm to 530 nm and an absorption spectral half width (full width at half maximum) of 15 nm to 45 nm.

The second coloring material has a maximum absorption wavelength in a range of 560 nm to 620 nm and an absorption spectral half width (full width at half maximum) of 15 nm to 55 nm.

In the third coloring material, a wavelength having the lowest transmittance in a wavelength range of 400 to 800 nm is in a range of 650 to 800 nm.

In the following description, the absorption spectral half width denotes the full width at half maximum.

The colored layer 30 has absorption in which the transmittance at the maximum absorption wavelength of one of absorption wavelength bands of the coloring materials is 1% or more and less than 50%.

When the coloring material having the above-described absorption characteristics is used as the first to third coloring materials to be contained in the colored layer 30, the colored layer 30 can absorb, of visible light emitted by a display device, visible light in a wavelength region in which the light emission intensity is relatively low. For example, the colored layer 30 can absorb, of visible light in a wavelength range of 400 to 800 nm, visible light in ranges of 470 nm to 530 nm, 560 nm to 620 nm, and 650 to 800 nm using the first, second, and third coloring materials, respectively. The wavelengths absorbed by the first, second, and third coloring materials are, for example, ranges overlapping wavelength regions in which the light emission intensity is relatively low, of visible light emitted by a display device in the spectrum during white display of an OLED display device illustrated in FIG. 6. The display device is not limited to an OLED display device and may be other display devices.

As the first to third coloring materials, there can be used a coloring material that contains one or more compounds selected from the group consisting of a compound having any of porphyrin structure, merocyanine structure, phthalocyanine structure, azo structure, cyanine structure, squarylium structure, coumarin structure, polyene structure, quinone structure, tetraazaporphyrin structure, pyrromethene structure, and indigo structure, and a metal complex thereof. In particular, it is more preferable to use squarylium structure or a metal complex having, in the molecule, porphyrin structure, pyrromethene structure, or phthalocyanine structure.

The colored layer 30 may contain at least one of a radical scavenger, a singlet oxygen quencher, and a peroxide decomposer.

The coloring material contained in the colored layer 30 is also degraded by light, heat, and other factors which are promoted under the influence of oxygen. When the radical scavenger is present in the colored layer 30, radicals produced during oxidative degradation of the colorant can be trapped to prevent degradation of the coloring material caused by autooxidation, which can further lengthen the period during which the color correction function is maintained.

Also, when the singlet oxygen quencher is present in the colored layer 30, it is possible to inactivate highly reactive singlet oxygen having the property of easily oxidatively degrading (fading) the colorant to suppress the oxidative degradation (color fading) of the colorant. When the peroxide decomposer is present in the colored layer 30, the peroxide decomposer decomposes peroxides generated during oxidative degradation of the colorant, which can terminate the autooxidation cycle and suppress colorant degradation (color fading).

The radical scavenger and the singlet oxygen quencher may be used in combination. Furthermore, the peroxide decomposer may be combined therewith.

As the radical scavenger, a hindered amine photostabilizer can be used. A hindered amine photostabilizer having a molecular weight of 2,000 or more, with which high color fading suppression effects can be obtained, is particularly preferable. When the radical scavenger has a low molecular weight, it easily volatilizes with the result that the number of molecules remaining in the colored layer 30 is small, and thus it is sometimes difficult to obtain sufficient color fading suppression effects. Examples of a material suitably used as the radical scavenger include Chimassorb 2020FDL, Chimassorb 944FDL, and Tinuvin 622 manufactured by BASF, and LA-63P manufactured by ADEKA Corporation.

Examples of the singlet oxygen quencher include transition metal complexes, colorants, amines, phenols, and sulfides. Examples of particularly suitably used materials include transition metal complexes of dialkyl phosphates, dialkyl dithiocarbamates, or benzene dithiol or similar dithiols. As the central metal of these transition metal complexes, nickel, copper, or cobalt is suitably used.

The peroxide decomposer has the function of decomposing peroxides generated during oxidative degradation of the colorant, terminating the autooxidation cycle, and suppressing colorant degradation (color fading). As the peroxide decomposer, a phosphorus-based antioxidant and a sulfur-based antioxidant can be used.

Examples of the phosphorus-based antioxidant include 2,2'-methylenebis(4,6-di-t-butyl-1-phenyloxy)(2-ethylhexyloxy)phosphorus, 3,9-bis(2,6-di-tert-butyl-4-methylphenoxy)-2,4,8,10-tetraoxa-3,9-diphosphaspiro[5.5]undecane, and 6-[3-(3-t-butyl-4-hydroxy-5-methylphenyl)propoxy]-2,4,8,10-tetra-t-butyldibenz[d,F][1,3,2]dioxaphosphepine.

Examples of the sulfur-based antioxidant include 2,2-bis({[3-(dodecylthio)propionyl]oxy}methyl)-1,3-propanediyl-bis[3-(dodecylthio)propionate], 2-mercaptobenzimidazole, dilauryl-3,3'-thiodipropionate, dimyristyl-3,3'-thiodipropionate, distearyl-3,3'-thiodipropionate, pentaerythrityl-tetrakis(3-laurylthiopropionate), and 2-mercaptobenzothiazole.

The optical function layer 20 illustrated in FIG. 1 includes a hardcoat layer 21 in contact with the colored layer 30 and a low refractive index layer 22 formed on the hardcoat layer 21.

The hardcoat layer 21 is a hard resin layer and enhances the scratch resistance of the optical film 1. Also, the hardcoat layer 21 may have a refractive index higher than that of the low refractive index layer 22. A resin constituting the hardcoat layer 21 is a resin curable by polymerization with the irradiation of active energy rays such as ultraviolet light and electron beams. Examples of such a resin to be used include monofunctional, bifunctional, or trifunctional or higher (meth)acrylate monomers. As described herein, "(meth)acrylate" is a generic name for both acrylate and methacrylate, and "(meth)acryloyl" is a generic name for both acryloyl and methacryloyl.

Examples of the monofunctional (meth)acrylate compound include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethyl carbitol (meth)acrylate, phosphate (meth)acrylate, ethylene-oxide-modified phosphate (meth)acrylate, phenoxy (meth)acrylate, ethylene-oxide-modified phenoxy (meth)acrylate, propylene-oxide-modified phenoxy (meth)acrylate, nonyl phenol (meth)acrylate, ethylene-oxide-modified nonyl phenol (meth)acrylate, propylene-oxide-modified nonyl phenol (meth)acrylate, methoxy diethylene glycol (meth)acrylate, methoxy polyethylene glycol (meth)acrylate, methoxy propylene glycol (meth)acrylate, 2-(meth)acryloyl oxyethyl-2-hydroxy propyl phthalate, 2-hydroxy-3-phenoxy propyl (meth)acrylate, 2-(meth)acryloyl oxyethyl hydrogen phthalate, 2-(meth)acryloyl oxypropyl hydrogen phthalate, 2-(meth)acryloyl oxypropyl hexahydro hydrogen phthalate, 2-(meth)acryloyl oxypropyl tetrahydro hydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, and adamantine derivatives of mono(meth)acrylates, such as adamantyl acrylate having monovalent mono(meth)acrylate derived from 2-adamantane and an adamantine diol.

Examples of the difunctional (meth)acrylate compound include di(meth)acrylates such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxy pivalic acid neopentyl glycol di(meth)acrylate.

Examples of the trifunctional or higher (meth)acrylate compound include tri(meth)acrylates such as trimethylolpropane tri(meth)acrylate, ethoxylated trimethylolpropane tri(meth)acrylate, propoxylated trimethylolpropane tri(meth)acrylate, tris-2-hydroxyethyl isocyanurate tri(meth)acrylate, and glycerol tri(meth)acrylate, trifunctional (meth)acrylate compounds such as pentaerythritol tri(meth)acrylate, dipentaerythritol tri(meth)acrylate, and ditrimethylolpropane tri(meth)acrylate, trifunctional or higher polyfunctional (meth)acrylate compounds such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate, and polyfunctional (meth)acrylate compounds in which a part of each of these (meth)acrylates is substituted with an alkyl group or F-caprolactone.

As the active energy ray-curing resin, urethane (meth)acrylate can also be used. An example of the urethane (meth)acrylate is one obtained by allowing a product obtained by allowing polyester polyol to react with an isocyanate monomer or prepolymer to react with a (meth)acrylate monomer having a hydroxyl group.

Examples of the urethane (meth)acrylate include a pentaerythritol triacrylate hexamethylene diisocyanate urethane prepolymer, a dipentaerythritol pentaacrylate hexamethylene diisocyanate urethane prepolymer, a pentaerythritol triacrylate toluene diisocyanate urethane prepolymer, a dipentaerythritol pentaacrylate toluene diisocyanate urethane prepolymer, a pentaerythritol triacrylate isophorone diisocyanate urethane prepolymer, and a dipentaerythritol pentaacrylate isophorone diisocyanate urethane prepolymer.

The above-described resins may be used singly or in combination of two or more. Also, the above-described resins may be a monomer in a composition for forming a hardcoat layer or a partially polymerized oligomer. The hardness of the hardcoat layer 21 is preferably H or above in pencil hardness at a surface load of 500 g.

The hardcoat layer 21 contains an ultraviolet absorber in order to suppress degradation of the colorant contained in the colored layer 30. Accordingly, the hardcoat layer 21 also serves as an ultraviolet shielding layer having an ultraviolet shielding rate of 85% or more. Here, the ultraviolet shielding rate is a value measured in accordance with JIS L 1925 and calculated according to the following equation:

ultraviolet shielding rate (%)=100−average transmittance (%) of ultraviolet light at wavelengths of 290 to 400 nm.

The absorption wavelength region in the ultraviolet region of the ultraviolet absorber contained in the hardcoat layer 21 is preferably in a range of 290 to 370 nm. Examples of such an ultraviolet absorber include benzophenone-based, benzotriazole-based, triazine-based, oxalic acid anilide-based, and cyanoacrylate-based compounds. The ultraviolet absorber is added for suppressing degradation of the colorant contained in the colored layer 30. Therefore, an ultraviolet absorber is used that has properties of absorbing light in a wavelength region that contributes to the degradation of the colorant contained in the colored layer 30, of the ultraviolet region.

However, when the amount of ultraviolet light absorbed by the ultraviolet absorber is excessively large during curing of the composition that contains the ultraviolet absorber, curing of the composition becomes insufficient, and the obtained optical film has insufficient surface hardness.

To address this concern, the hardcoat layer 21 (the optical function layer 20) in the present embodiment contains an ultraviolet shielding layer (ultraviolet absorption layer) as a cured film of a composition that contains an energy ray-curing type compound, a photoinitiator, and an ultraviolet absorber, in which the absorption wavelength region in the ultraviolet region of the ultraviolet absorber is a range different from the absorption wavelength region in the ultraviolet region of the photoinitiator. This can suppress the ultraviolet absorber from inhibiting the curing of a cured film. Also, since a cured film can be cured to a prescribed curing degree, a cured layer having an intended hardness can be reliably obtained.

As the photoinitiator in which the absorption wavelength region is different from the absorption wavelength region of the ultraviolet absorber contained in any of layers constituting the ultraviolet shielding layer (wavelength region that contributes to degradation of the colorant contained in the colored layer 30), an acylphosphine oxide-based photoinitiator can be suitably used. Examples of the acylphosphine oxide-based photoinitiator include diphenyl(2,4,6-trimethylbenzoyl)phosphine oxide and phenylbis(2,4,6-trimethylbenzoyl)phosphine oxide.

When the absorption wavelength region differs between the ultraviolet absorber and the photoinitiator, the inhibition of curing during the formation of the ultraviolet shielding layer that contains the ultraviolet absorber can be suppressed, and after curing, the colorant contained in the colored layer 30 can be suppressed from being degraded by ultraviolet light.

Examples of other photoinitiators used in the composition for forming a hardcoat layer include 2,2-ethoxyacetophenone, 1-hydroxycyclohexyl phenyl ketone, dibenzoyl, benzoin, benzoin methyl ether, benzoin ethyl ether, p-chlorobenzophenone, p-methoxybenzophenone, Michler's ketone, acetophenone, and 2-chlorothioxanthone. These may be used singly or in combination of two or more.

Also, examples of a solvent used in the composition for forming a hardcoat layer include ethers such as dibutyl ether, dimethoxymethane, dimethoxyethane, diethoxyethane, propylene oxide, 1,4-dioxane, 1,3-dioxolane, 1,3,5-trioxane, tetrahydrofuran, anisole, and phenetole, ketones such as acetone, methyl ethyl ketone, diethyl ketone, dipropyl ketone, diisobutyl ketone, methyl isobutyl ketone, cyclopentanone, cyclohexanone, and methylcyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve and cellosolve acetate. These may be used singly or in combination of two or more.

Also, the composition for forming a hardcoat layer may contain metal oxide fine particles for the purposes of adjusting the refractive index and imparting hardness. Examples of the metal oxide fine particles include zirconium oxide, titanium oxide, niobium oxide, antimony trioxide, antimony pentoxide, tin oxide, indium oxide, indium tin oxide, and zinc oxide.

Also, the composition for forming a hardcoat layer may contain any of silicon oxide, fluorine-containing silane compounds, fluoroalkyl silazane, fluoroalkyl silane, fluorine-containing silicon-based compounds, and perfluoropolyether group-containing silane coupling agents, which impart water and/or oil repellency and enhance anti-fouling properties.

Other additives to be added to the composition for forming a hardcoat layer include a leveling agent, an anti-foaming agent, an antioxidant, a photostabilizer, a photosensitizer, and an electrically conductive material.

When the optical film 1 is applied to a display device, the low refractive index layer 22 is disposed on a side that is closest to a user (viewer) who views a display. The low refractive index layer 22 prevents the strong reflection of external light and improves the visibility of the display device.

The low refractive index layer 22 may be a layer that contains an inorganic material or an inorganic compound. Examples of the inorganic material and the inorganic compound include fine particles of LiF, MgF, 3NaF·AIF, AIF, $NA_3AlF_6$, and others as well as silica fine particles. Also, when the silica fine particles have voids inside particles such as porous silica fine particles and hollow silica fine particles, the refractive index of the low refractive index layer can be effectively lowered. Also, the composition for forming a low refractive index layer may be appropriately formulated with the photoinitiator, the solvent, and other additives described for the hardcoat layer 21.

The refractive index of the low refractive index layer 22 has only to be lower than the refractive index of the substrate 10 and preferably 1.55 or less. Also, the film thickness of the low refractive index layer 22 is not particularly limited but is preferably 40 nm to 1 m.

The low refractive index layer 22 may contain any of silicon oxide, fluorine-containing silane compounds, fluoroalkyl silazane, fluoroalkyl silane, fluorine-containing silicon-based compounds, and perfluoropolyether group-containing silane coupling agents. Since these materials can impart water and/or oil repellency to the low refractive index layer 22, anti-fouling properties can be enhanced.

The optical film 1 can be manufactured by forming the colored layer 30 on the first surface 10*a* of the substrate 10 and sequentially forming, on the colored layer 30, the hardcoat layer 21 and the low refractive index layer 22.

The colored layer 30, the hardcoat layer 21, and the low refractive index layer 22 can be formed by, for example, coating with a coating liquid that contains constituent materials of each layer and drying the coat. The low refractive index layer 22 can also be formed by, for example, vapor deposition or sputtering.

The hardcoat layer 21 can be simply formed when formed with an energy ray-curing compound such as an ultraviolet light-curing resin. In this case, the hardcoat layer 21 can be formed by coating with a coating liquid that contains an energy ray-curing compound, a photoinitiator, and an ultraviolet absorber and irradiating the coat with the corresponding energy ray. When an ultraviolet light-curing resin is used, it is preferable that, as previously described, the absorption wavelength region in the ultraviolet region of the photoinitiator is different from the absorption wavelength region in the ultraviolet region of the ultraviolet absorber.

The optical film 1 can be disposed, as a color correction filter, inside a display device such as a display. The optical film 1 is disposed in such a manner that a second surface (10*b* illustrated in FIG. 1) opposite the first surface 10*a* of the substrate 10 faces the light source side.

When light emitted from a light source passes through the colored layer 30, a wavelength component at and around the maximum absorption wavelength of the contained coloring material is absorbed. This can improve the color purity of the display device. Furthermore, unlike in a color filter, the concentration of the coloring material does not need to be increased very much, and thus the color purity can be improved without excessively lowering the luminance of the display device.

The coloring material contained in the colored layer 30 is excellent in the color correction function but sometimes has insufficient resistance to light, especially to ultraviolet light. Therefore, degradation proceeds with time in response to irradiation with ultraviolet light, with the result that light at and around the maximum absorption wavelength cannot be absorbed.

When the optical film 1 of the present embodiment is attached to a display device as described above, external light containing ultraviolet light and entering the display screen passes through the hardcoat layer 21 and then enters the colored layer 30. Since the hardcoat layer 21 has a high ultraviolet shielding rate, a major portion of ultraviolet light contained in external light does not pass through the hardcoat layer 21 and fails to reach the colored layer 30. Accordingly, in the optical film 1, ΔE*ab, which is a chromaticity difference between before and after a light resistance test (irradiation for 120 hours under the conditions of a xenon lamp illuminance of 60 $W/cm^2$ (300 to 400 nm), a temperature of 45° C., and a humidity of 50% RH), can satisfy Equation (1) below:

$$\Delta E^*ab \leq 5 \quad \text{Equation (1).}$$

In brief, degradation of the coloring material contained in the colored layer 30 can be prevented, and the color correction function can be maintained for a long time. It is noted that ΔE*ab of Equation (1) is a chromaticity difference standardized by the CIE (Commission International del'Eclairage).

Second Embodiment

The second embodiment of the present invention will be described with reference to FIG. 2. In the following description, components that are common to those described above are denoted by the same reference signs, and duplicated description thereof will be omitted.

FIG. 2 is a schematic cross-sectional view illustrating a layer structure of an optical film 1A of the present embodiment. The optical film 1A includes: a transparent substrate 10; a colored layer 30 that is formed on a first surface 10*a* side of the substrate 10 and contains a colorant; and an optical function layer 20 formed on the colored layer 30. The optical film 1A includes, as the optical function layer 20, an anti-glare layer (AG layer) 23. The optical function layer 20 may have an ultraviolet shielding layer and have the layer that contains an ultraviolet absorber described in the first embodiment, or an ultraviolet absorber may be contained in the anti-glare layer 23. Also, the ultraviolet shielding layer has an ultraviolet shielding rate in accordance with JIS L 1925 of 85% or more.

The anti-glare layer 23 is a layer that has microscopic asperities on the surface and scatters external light by the asperities to reduce reflected glare of external light. The anti-glare layer 23 can be formed by coating with a composition for forming an anti-glare layer that contains an active energy ray-curing resin and, as necessary, organic fine particles and/or inorganic fine particles. Examples of the active energy ray-curing resin used in the composition for forming an anti-glare layer include the resins described for the hardcoat layer 21. This can enhance the scratch resistance of the optical film 1A. The film thickness of the anti-glare layer 23 is not particularly limited but preferably 1 to 10 m.

The organic fine particles used in the composition for forming an anti-glare layer are a material that mainly forms microscopic asperities on the surface of the anti-glare layer 23 to impart the function of scattering external light. Examples of usable organic fine particles include resin particles constituted by a translucent resin material such as acrylic resin, polystyrene resin, styrene-(meth)acrylic acid ester copolymers, polyethylene resin, epoxy resin, silicone resin, polyvinylidene fluoride, and polyethylene fluoride-based resin. For adjusting the refractive index and the dispersibility of resin particles, two or more types of resin particles having different material properties (refractive indices) may be mixed and used.

The inorganic fine particles used in the composition for forming an anti-glare layer are a material for mainly adjusting the sedimentation and aggregation of organic fine particles in the anti-glare layer 23. Examples of usable inorganic fine particles include silica fine particles, metal oxide fine particles, and various mineral fine particles. Examples of usable silica fine particles include colloidal silica and silica fine particles surface-modified with a reactive functional group such as a (meth)acryloyl group. Examples of usable metal oxide fine particles include alumina, zinc oxide, tin oxide, antimony oxide, indium oxide, titania, and zirconia. Examples of usable mineral fine particles include mica, synthetic mica, vermiculite, montmorillonite, iron montmorillonite, bentonite, beidellite, saponite, hectorite, stevensite, nontronite, magadiite, ilerite, kanemite, layered titanic acid, smectite, and synthetic smectite. The mineral fine particles to be used may be either a natural product or a synthetic product (including a substituted body and a derivative) and may be a mixture of both. Among the mineral fine particles, layered organic clay is more preferable. Layered organic clay refers to swellable clay including organic onium ions introduced in the interlayer. The organic onium ion may be any one that can convert the swellable clay into an organic form by utilizing the cation exchangeability of the swellable clay. When layered organic clay mineral is used as mineral fine particles, the above-described synthetic smectite can be suitably used. The synthetic smectite has the function of increasing the viscosity of the coating liquid for forming an anti-glare layer, suppressing the sedimentation of resin particles and inorganic fine particles, and adjusting the concavo-convex shape of the surface of the optical function layer.

The composition for forming an anti-glare layer may contain any of silicon oxide, fluorine-containing silane compounds, fluoroalkyl silazane, fluoroalkyl silane, fluorine-containing silicon-based compounds, and perfluoropolyether group-containing silane coupling agents. Since these materials can impart water and/or oil repellency to the anti-glare layer 23, anti-fouling properties can be enhanced.

The anti-glare layer 23 may be formed as a layer in which a layer having a relatively high refractive index and a layer having a relatively low refractive index are laminated sequentially from the colored adhesive layer 30 side (from the lower side), by allowing the materials to be unevenly distributed. The anti-glare layer 23 in which the materials are unevenly distributed can be formed by, for example, coating with a composition including a high refractive index material and a low refractive index material that contains surface-treated silica fine particles or hollow silica fine particles, and phase-separating the coat by taking advantage of a difference in surface free energy between both materials. When the anti-glare layer 23 is constituted by the two phase-separated layers, it is preferable that the layer having a relatively high refractive index on the colored layer 30 side has a refractive index of 1.50 to 2.40, and the layer having a relatively low refractive index on the surface side of the optical film 1A has a refractive index of 1.20 to 1.55.

The optical film 1A can be manufactured by forming the colored layer 30 on the first surface 10*a* of the substrate 10 and sequentially forming the anti-glare layer 23 on the colored layer 30. The anti-glare layer 23 can be formed by, for example, coating with a coating liquid that contains constituent materials of each layer and drying the coat.

The optical film 1A according to the present embodiment can reduce reflected glare of external light while preventing degradation of the coloring material contained in the colored layer 30, similarly to in the above-described first embodiment.

Third Embodiment

The third embodiment of the present invention will be described with reference to FIG. 3. In the following description, components that are common to those described above are denoted by the same reference signs, and duplicated description thereof will be omitted.

FIG. 3 is a schematic cross-sectional view illustrating a layer structure of an optical film 1B of the present embodiment. The optical film 1B includes: a transparent substrate 10; a colored layer 30 that is formed on a first surface 10*a* side of the substrate 10 and contains a colorant; and an optical function layer 20 formed on the colored layer 30. The optical film 1B includes, as the optical function layer 20, a hardcoat layer 21 and an anti-glare layer 23 formed on the hardcoat layer 21. The optical function layer 20 may have an ultraviolet shielding layer and have the layer that contains the ultraviolet absorber described in the first embodiment, or an ultraviolet absorber may be contained in the hardcoat layer 21 or the anti-glare layer 23. Also, the ultraviolet shielding layer has an ultraviolet shielding rate in accordance with JIS L 1925 of 85% or more.

The optical film 1B can be manufactured by forming the colored layer 30 on the first surface 10*a* of the substrate 10 and sequentially forming, on the colored layer 30, the hardcoat layer 21 and the anti-glare layer 23.

The optical film 1B according to the present embodiment can exert the same effects as those of the above-described embodiments and the optical function based on the optical function layer 20.

Fourth Embodiment

The fourth embodiment of the present invention will be described with reference to FIG. 4. In the following description, components that are common to those described above are denoted by the same reference signs, and duplicated description thereof will be omitted.

FIG. 4 is a schematic cross-sectional view illustrating a layer structure of an optical film 1C of the present embodiment. The optical film 1C includes: a transparent substrate 10; a colored layer 30 that is formed on a first surface 10*a* side of the substrate 10 and contains a colorant; and an optical function layer 20 formed on the colored layer 30. The optical film 1C includes, as the optical function layer 20, an anti-glare layer 23 and a low refractive index layer 22 formed on the anti-glare layer 23. The optical function layer 20 may have an ultraviolet shielding layer and have the layer that contains the ultraviolet absorber described in the first embodiment, or an ultraviolet absorber may be contained in the anti-glare layer 23 or the low refractive index layer 22. Also, the ultraviolet shielding layer has an ultraviolet shielding rate in accordance with JIS L 1925 of 85% or more.

The optical film 1C can be manufactured by forming the colored layer 30 on the first surface 10*a* of the substrate 10 and sequentially forming, on the colored layer 30, the anti-glare layer 23 and the low refractive index layer 22.

The optical film 1C according to the present embodiment can exert the same effects as those of the above-described embodiments and the optical function based on the optical function layer 20.

Fifth Embodiment

The fifth embodiment of the present invention will be described with reference to FIG. 5. In the following description, components that are common to those described above are denoted by the same reference signs, and duplicated description thereof will be omitted.

FIG. 5 is a schematic cross-sectional view illustrating a layer structure of an optical film 1D of the present embodiment. The optical film 1D includes: a transparent substrate 10; a colored layer 30 that is formed on a first surface 10*a* side of the substrate 10 and contains a colorant; and an optical function layer 20 formed on the colored layer 30. The optical film 1D includes, as the optical function layer 20, an oxygen barrier layer 40, a hardcoat layer 21 formed on the oxygen barrier layer 40, and a low refractive index layer 22 formed on the hardcoat layer 21. The optical function layer 20 may have an ultraviolet shielding layer and have the layer that contains the ultraviolet absorber described in the first embodiment, or an ultraviolet absorber may be contained in the oxygen barrier layer 40, the hardcoat layer 21, or the low refractive index layer 22. Also, the ultraviolet shielding layer has an ultraviolet shielding rate in accordance with JIS L 1925 of 85% or more.

The oxygen barrier layer 40 is an optically transmissive, transparent layer and has an oxygen permeability of 10 cc/($m^2$·day·atm) or less, more preferably 5 cc/($m^2$·day·atm) or less, and further preferably 1 cc/($m^2$·day·atm) or less. A material for forming the oxygen barrier layer 40 preferably contains polyvinyl alcohol (PVA), ethylene-vinyl alcohol copolymers (EVOH), vinylidene chloride, siloxane resin, and others, and Maxive (registered trademark) manufactured by Mitsubishi Gas Chemical Company, Inc., EVAL manufactured by Kuraray Co., Ltd., Saran Latex and Saran Resin manufactured by Asahi Kasei Corp., and others can be used. The thickness of the oxygen barrier layer 40 is not particularly limited and has only to be a thickness that enables desired oxygen barrier properties to be obtained.

Also, inorganic particles (particles including an inorganic compound) may be dispersed in the oxygen barrier layer 40. The inorganic particles can further lower the oxygen permeability and can further suppress the oxidative degradation (color fading) of the colored layer 30. The size and content of the inorganic particles are not particularly limited and have only to be appropriately set depending on, for example, the thickness of the oxygen barrier layer 40. The size (maximum length) of the inorganic particles dispersed in the oxygen barrier layer 40 is preferably less than the thickness of the oxygen barrier layer 40 and advantageously as small as possible. The size of the inorganic particles dispersed in the oxygen barrier layer 40 may be either uniform or non-uniform. Specific examples of the inorganic particles dispersed in the oxygen barrier layer 40 include silica particles, alumina particles, silver particles, copper particles, titanium particles, zirconia particles, and tin particles.

The optical film 1D can be manufactured by forming the colored layer 30 on the first surface 10*a* of the substrate 10 and sequentially forming, on the colored layer 30, the oxygen barrier layer 40, the hardcoat layer 21, and the low refractive index layer 22.

When the optical film 1D according to the present embodiment is attached to a display device as described above, oxygen contained in external air does not reach the colored layer 30 as long as it does not pass through the oxygen barrier layer 40. This suppresses degradation of the coloring material caused by light, heat, and others which are promoted under the influence of oxygen in external air, and the color correction function is maintained for a long time.

In the present embodiment, the number of oxygen barrier layers 40 and the position thereof can be appropriately set. For example, the oxygen barrier layer 40 has only to be laminated on the viewer side as a layer above the colored layer 30. Also, in the optical films 1A and 1C according to the second and fourth embodiments, the oxygen barrier layer 40 may be further disposed between the colored layer 30 and the anti-glare layer 23. Also, in the optical film 1B according to the third embodiment, the oxygen barrier layer 40 may be further disposed between the colored layer 30 and the hardcoat layer 21 or between the hardcoat layer 21 and the anti-glare layer 23. When the oxygen barrier layer 40 is further provided, color fading caused by oxidation of the colorant can be further suppressed, similarly to in the fifth embodiment.

For example, another oxygen barrier layer may be disposed between the colored layer 30 and the substrate 10 to achieve a structure in which the colored layer 30 is sandwiched by oxygen barrier layers.

In the present invention, the optical function layer 20 is not limited to the above-described structures.

For example, an anti-reflection layer including a combination of a low refractive index layer and a high refractive index layer is also an example of the optical function layer 20 in the present invention. As the resin used in the composition for forming a high refractive index layer, the active energy ray-curing resin described for the hardcoat layer 21 may be used. This can enhance the scratch resistance of the optical film, in addition to the function of preventing reflection.

EXAMPLES

The optical film according to the present invention will be further described using examples and comparative examples. The present invention is not limited in any way by the specific contents of the following examples.

Examples 1 to 11 and Comparative Examples 1 to 10

In the following examples and comparative examples, optical films 1 to 21 having layer structures illustrated in Table 1 and Table 2 were prepared, and properties of the prepared films were evaluated. Also, optical properties of OLED display devices 1 to 7 which include the optical films 8, 10, 11, and 18 to 21, illustrated in Table 3, were confirmed by simulation.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Optical film | Optical film 1 | Optical film 2 | Optical film 3 | Optical film 4 | Optical film 5 | Optical film 6 | Optical film 7 | Optical film 8 | Optical film 9 | Optical film 10 | Optical film 11 |
| Functional layer 1 | | Low RI layer 1 | Anti-glare layer 1 | — | Low RI layer 1 | Low RI layer 1 | Low RI layer 1 | Low RI layer 1 | Low RI layer 1 | Low RI layer 1 | Low RI layer 1 |
| Functional layer 2 | Hardcoat layer 1 | Hardcoat layer 1 | Hardcoat layer 2 | Anti-glare layer 1 | Anti-glare layer 1 | Hardcoat layer 1 | Hardcoat layer 1 | Hardcoat layer 1 | Hardcoat layer 1 | Hardcoat layer 1 | Hardcoat layer 1 |
| Functional layer 3 | — | — | — | — | — | — | — | — | Oxygen barrier layer 1 | — | — |
| Colored layer | Colored layer 1 | Colored layer 1 | Colored layer 1 | Colored layer 1 | Colored layer 1 | Colored layer 5 | Colored layer 2 | Colored layer 3 | Colored layer 1 | Colored layer 6 | Colored layer 7 |
| Substrate | TAC | TAC | TAC | TAC | TAC | TAC | TAC | TAC | TAC | TAC | TAC |

TABLE 2

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Optical film | Optical film 12 | Optical film 13 | Optical film 14 | Optical film 15 | Optical film 16 | Optical film 17 | Optical film 18 | Optical film 19 | Optical film 20 | Optical film 21 |
| Functional layer 1 | | Low RI layer 1 | Low RI layer 1 | Low RI layer 1 | Low RI layer 1 | Low RI layer 1 | Low RI layer 1 | Low RI layer 1 | Low RI layer 1 | Low RI layer 1 |
| Functional layer 2 | Hardcoat layer 2 | Hardcoat layer 2 | Hardcoat layer 2 | Hardcoat layer 3 | Hardcoat layer 2 | Hardcoat layer 2 | Hardcoat layer 1 | Hardcoat layer 1 | Hardcoat layer 1 | Hardcoat layer 1 |
| Functional layer 3 | — | — | — | — | — | — | — | — | — | — |
| Colored layer | Colored layer 1 | Colored layer 1 | Colored layer 4 | Colored layer 1 | Colored layer 6 | Colored layer 7 | — | Colored layer 8 | Colored layer 9 | Colored layer 10 |
| Substrate | TAC | TAC | TAC | TAC | TAC | TAC | TAC | TAC | TAC | TAC |

TABLE 3

| | Example 12 | Example 13 | Example 14 | Comparative Example 7 | Comparative Example 8 | Comparative Example 9 | Comparative Example 10 |
|---|---|---|---|---|---|---|---|
| Organic EL display device | Display device 1 | Display device 2 | Display device 3 | Display device 4 | Display device 5 | Display device 6 | Display device 7 |
| Optical film | Optical film 8 | Optical film 10 | Optical film 11 | Optical film 18 | Optical film 19 | Optical film 20 | Optical film 21 |
| Functional layer 1 | Low RI layer 1 | Low RI layer 1 | Low RI layer 1 | Low RI layer 1 | Low RI layer 1 | Low RI layer 1 | Low RI layer 1 |
| Functional layer 2 | Hardcoat layer 1 | Hardcoat layer 1 | Hardcoat layer 1 | Hardcoat layer 1 | Hardcoat layer 1 | Hardcoat layer 1 | Hardcoat layer 1 |
| Colored layer | Colored layer 3 | Colored layer 6 | Colored layer 7 | — | Colored layer 8 | Colored layer 9 | Colored layer 10 |
| Substrate | TAC | TAC | TAC | TAC | TAC | TAC | TAC |

<Preparation of Optical Film>

Hereinafter, a method of forming each layer will be described.

[Formation of Colored Layer]

(Materials of Composition for Forming Colored Layer)

There were used the following materials of a composition for forming a colored layer used in forming the colored layer. It is noted that for the maximum absorption wavelength and half width of the coloring material, characteristic values in the cured coat were calculated from a spectral transmittance.

First Coloring Material:

Dye-1 Pyrromethene cobalt complex dye represented by chemical formula 1 described later (maximum absorption wavelength: 493 nm, half width: 26 nm)

Second Coloring Material:

Dye-2 Tetraazaporphyrin copper complex dye (FDG-007 manufactured by Yamada Kagaku Co., Ltd., maximum absorption wavelength: 595 nm, half width: 22 nm)

Dye-3 Tetraazaporphyrin copper complex dye (PD-311S manufactured by Yamamoto Chemicals, Inc., maximum absorption wavelength: 586 nm, half width: 22 nm)

Third Coloring Material:

Dye-4 Phthalocyanine copper complex dye (FDN-002 manufactured by Yamada Kagaku Co., Ltd., maximum absorption wavelength: 800 nm (a wavelength having the lowest transmittance in a wavelength range of 400 to 800 nm is 800 nm.))

Coloring Materials Other than First to Third Coloring Materials:

Dye-5 Dye (FDG-003 manufactured by Yamada Kagaku Co., Ltd., maximum absorption wavelength: 545 nm, half width: 79 m)

Dye-6 Dye (FDG-004 manufactured by Yamada Kagaku Co., Ltd., maximum absorption wavelength: 575 nm, half width: 63 m)

Additive:

Hindered amine photostabilizer Chimassorb 944FDL (manufactured by BASF Japan Ltd., molecular weight: 2000 to 3100)

Hindered amine photostabilizer Tinuvin 249 (manufactured by BASF Japan Ltd., molecular weight: 482)

Singlet oxygen quencher D1781 (manufactured by Tokyo Chemical Industry Co., Ltd., dialkyl dithiocarbamate nickel complex)

Ultraviolet Absorber:

Tinuvin 479 (manufactured by BASF Japan Ltd., maximum absorption wavelength: 322 nm)

LA-36 (manufactured by ADEKA Corporation, maximum absorption wavelength: 310 nm, 350 nm)

Active Energy Ray-Curing Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator:

Omnirad TPO (manufactured by IGM Resing B. V., absorption wavelength peak: 275 nm, 379 nm)

Solvent:

MEK (methyl ethyl ketone)

Methyl acetate

[Chemical Formula 1]

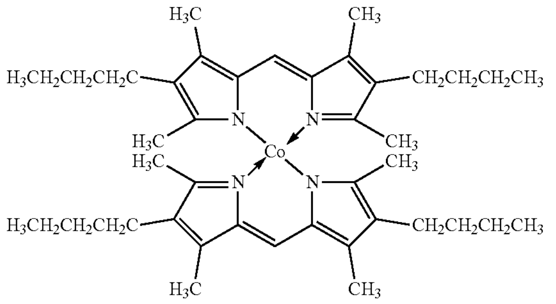

(Formation of Colored Layer)

A triacetyl cellulose film (TAC) having a thickness of 60 m was used as the transparent substrate. One surface of the transparent substrate was coated with the composition for forming a colored layer illustrated in Table 4 and dried in an oven at 80° C. for 60 seconds. Thereafter, irradiation with ultraviolet light was performed at an irradiation dose of 150 mJ/cm$^2$ using an ultraviolet light irradiation device (manufactured by Fusion UV Systems Japan K.K., light source: H bulb) to cure the coat. The thickness was adjusted to a film thickness after curing of 5.0 μm to form colored layers 1 to 10. It is noted that the added amount is a mass ratio.

[Formation of Optical Function Layer]

(Composition for Forming Oxygen Barrier Layer)

PVA117 (manufactured by Kuraray Co., Ltd.) 80% aqueous solution (Formation of Oxygen Barrier Layer)

The above-described composition for forming an oxygen barrier layer was applied on the colored layer and dried to form an oxygen barrier layer 1 having an oxygen permeability of 1 cc/(m$^2$·day·atm) illustrated in Table 1.

(Composition for Forming Hardcoat Layer)

There were used the following materials of a composition for forming a hardcoat layer used in forming the hardcoat layer.

Ultraviolet Absorber:

Tinuvin 479 (manufactured by BASF Japan Ltd., maximum absorption wavelength: 322 nm)

LA-36 (manufactured by ADEKA Corporation, maximum absorption wavelength: 310 nm, 350 nm)

Active Energy Ray-Curing Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator:

Omnirad TPO (manufactured by IGM Resins B. V., absorption wavelength peak: 275 nm, 379 nm)

Omnirad 184 (manufactured by IGM Resins B. V., absorption wavelength peak: 243 nm, 331 nm)

TABLE 4

| | | Colored layer 1 | Colored layer 2 | Colored layer 3 | Colored layer 4 | Colored layer 5 | Colored layer 6 | Colored layer 7 | Colored layer 8 | Colored layer 9 | Colored layer 10 |
|---|---|---|---|---|---|---|---|---|---|---|---|
| Colorant | 1st coloring material | | | Dye-1 | | | | | Dye-1 | — | |
| | Amount | 0.2% | 0.2% | 0.2% | 0.2% | 0.2% | 0.1% | — | 0.2% | — | |
| | 2nd coloring material | | | — | | | | Dye-2 | Dye-3/Dye-2 = 60/40 | — | |
| | Amount | | | — | | | | 0.2% | 0.5% | — | |
| | 3rd coloring material | | | — | | | Dye-4 | — | — | — | — |
| | Amount | | | — | | | 1.5% | — | — | — | — |
| | 4th coloring material | | | | — | | | | | Dye-5 | Dye-6 |
| | Amount | | | | — | | | | | 0.2% | 0.2% |
| Additive | Type | — | Chimassorb 944FDL | Chimassorb 944FDL D1781 | — | Tinuvin 249 | — | — | Chimassorb 944FDL/ D1781 | — | |
| | Ratio | — | 100 | 67/33 | — | 100 | — | — | 67/33 | — | |
| | Amount | — | 1.4% | 2.2% | — | 1.4% | — | — | 3.2% | — | |
| UV absorber | Type | | — | | Tinuvin 479/LA36 | | | | — | | |
| | Ratio | | — | | 40/60 | | | | — | | |
| | Amount | | — | | 3.20% | | | | — | | |
| Active energy ray-curing resin | Type | | | | | UA-306H/DPHA/PETA | | | | | |
| | Ratio | | | | | 70/20/10 | | | | | |
| | Amount | 45.2% | 43.8% | 43.0% | 42.0% | 43.8% | 43.8% | 45.2% | 41.5% | 45.2% | 45.2% |
| Photo-initiator | Type | | | | | Omnirad TPO | | | | | |
| | Amount | | | | | 4.6% | | | | | |
| Solvent | Type | | | | | MEK/methyl acetate | | | | | |
| | Ratio | | | | | 50/50 | | | | | |
| | Amount | | | | | 50% | | | | | |

Solvent:
MEK (methyl ethyl ketone)
Methyl acetate
(Formation of Hardcoat Layer)

The composition for forming a hardcoat layer illustrated in Table 5 was applied on the colored layer, the transparent substrate, or the oxygen barrier layer 1 and dried in an oven at 80° C. for 60 seconds. Thereafter, the coat was cured by irradiation with ultraviolet light at an irradiation dose of 150 mJ/cm$^2$ using an ultraviolet light irradiation device (manufactured by Fusion UV Systems Japan K.K., light source: H bulb) to form hardcoat layers 1 to 3 having a film thickness after curing of 5.0 μm illustrated in Tables 1 and 2. It is noted that the hardcoat layers 1 and 3 contain an ultraviolet absorber and thus also serve as an ultraviolet shielding layer.

TABLE 5

| | | Hardcoat layer 1 | Hardcoat layer 2 | Hardcoat layer 3 |
|---|---|---|---|---|
| UV absorber | Type | Tinuvin 479/LA36 | — | Tinuvin 479/LA36 |
| | Ratio | 40/60 | — | 40/60 |
| | Amount | 3.2% | — | 3.2% |
| Active energy ray-curing resin | Type | | UA-306H/DPHA/PETA | |
| | Ratio | | 70/20/10 | |
| | Amount | 42.2% | 45.4% | 42.2% |
| Photoinitiator | Type | Omnirad TPO | | Omnirad 184 |
| | Amount | | 4.6% | |
| Solvent | Type | | MEK/methyl acetate | |
| | Ratio | | 50/50 | |
| | Amount | | 50% | |

(Composition for Forming Anti-Glare Layer)

There were used the following materials as a composition for forming an anti-glare layer.

Ultraviolet Absorber:
Tinuvin 479 (manufactured by BASF Japan Ltd., maximum absorption wavelength: 322 nm)
LA-36 (manufactured by ADEKA Corporation, maximum absorption wavelength: 310 nm, 350 nm)
Active Energy Ray-Curing Resin:
Light Acrylate PE-3A (manufactured by Kyoeisha Chemical Co., Ltd., refractive index: 1.52)
Photoinitiator:
Omnirad TPO (manufactured by IGM Resins B. V., absorption wavelength peak: 275 nm, 379 nm)
Organic Fine Particles:
Styrene-methyl methacrylate copolymer particles (refractive index: 1.515, average particle size: 2.0 m)
Inorganic fine particles 1:
Synthetic Smectite
Inorganic fine particles 2:
Alumina nanoparticles, average particle size: 40 nm
Solvent
Toluene
Isopropyl alcohol
(Formation of Anti-Glare Layer)

The composition for forming an anti-glare layer illustrated in Table 6 was applied on the colored layer or the hardcoat layer of the layer structures in Table 1 and dried in an oven at 80° C. for 60 seconds. Thereafter, the coat was cured by irradiation with ultraviolet light at an irradiation dose of 150 mJ/cm$^2$ using an ultraviolet light irradiation device (manufactured by Fusion UV Systems Japan K.K., light source: H bulb) to form an anti-glare layer having a film thickness after curing of 5.0 μm illustrated in Table 1. It is noted that an anti-glare layer 1 contains an ultraviolet absorber and thus also serves as an ultraviolet shielding layer.

TABLE 6

| | | Anti-glare layer 1 |
|---|---|---|
| UV absorber | Type | Tinuvin 479/LA36 |
| | Ratio | 40/60 |
| | Amount | 3.20% |
| Active energy ray-curing resin | Type | PE-3A |
| | Amount | 40.5% |
| Organic fine particles | Type | Styrene-methyl methacrylate copolymer particles |
| | Amount | 0.5% |
| Inorganic fine particles | Type | Synthetic smectite/alumina nanoparticles |
| | Ratio | 20/80 |
| | Amount | 1.25% |
| Photoinitiator | Type | Omnirad TPO |
| | Amount | 4.55% |
| Solvent | Type | Toluene/isopropyl alcohol |
| | Ratio | 30/70 |
| | Amount | 50% |

(Composition for Forming Low Refractive Index Layer)

As a composition for forming a low refractive index layer, the following materials were used.

Refractive Index Adjuster:
Dispersion liquid of porous silica fine particles (average particle size: 75 nm, solid content: 20%, solvent: methyl isobutyl ketone)8.5 parts by mass
Anti-fouling properties-imparting agent:
Optool AR-110 (manufactured by Daikin Industries Ltd., solid content: 15%, solvent: methyl isobutyl ketone)5.6 parts by mass
Active energy ray-curing resin:
Pentaerythritol triacrylate 0.4 part by mass
Initiator:
Omnirad 184 (manufactured by IGM Resins B. V.)0.07 part by mass
Leveling agent:
RS-77 (manufactured by DIC Corporation)1.7 parts by mass
Solvent:
Methyl isobutyl ketone 83.73 parts by mass
(Formation of Low Refractive Index Layer)

The composition for forming a low refractive index layer, having the above-described make-up, was applied on the hardcoat layer or the anti-glare layer and dried in an oven at 80° C. for 60 seconds. Thereafter, the coat was cured by irradiation with ultraviolet light at an irradiation dose of 200 mJ/cm$^2$ using an ultraviolet light irradiation device (manufactured by Fusion UV Systems Japan K.K., light source: H bulb) to form a low refractive index layer having a film thickness after curing of 100 nm illustrated in Table 1 and Table 2.

[Characteristic Evaluation of Film]
(Ultraviolet Shielding Rate)

The ultraviolet shielding layer (ultraviolet absorption layer) formed on the colored layer of the obtained optical film was peeled from the colored layer using a cellophane tape based on a JIS-K5600 adhesion test to transfer the ultraviolet shielding layer as a single layer onto the cellophane tape. It is noted that the ultraviolet shielding layer (ultraviolet absorption layer) of the optical film is a layer that contains an ultraviolet absorber, in the optical function layer, and is the hardcoat layers 1 and 3 as well as the anti-glare layer 1. The ultraviolet shielding layer (ultraviolet absorption layer) contained in each of the optical films is illustrated in Tables 7 and 8.

With reference to a portion of the cellophane tape in which there is no ultraviolet shielding layer, the transmittance of the ultraviolet shielding layer as a single layer was measured using an automatic spectrophotometer (U-4100, manufactured by Hitachi, Ltd.) to calculate an average transmittance in the ultraviolet region (290 to 400 nm). With the obtained average transmittance, the ultraviolet shielding rate represented by Equation (2) was calculated.

Ultraviolet shielding rate (%)=100−average transmittance (%) in ultraviolet region (290 to 400 nm) Equation (2)

(Pencil Hardness Test)

The surface of the optical film was subjected to a pencil hardness test based on JIS-K5400-1990 which is performed using a pencil (UNI manufactured by Mitsubishi Pencil Co., Ltd., pencil hardness H) with a load of 500 g, using a Clemens type scratch hardness tester (HA-301, manufactured by Tester Sangyo Co., Ltd.). Change in appearance due to scratching was visually evaluated. OK was assigned when a scratch is not observed, and Poor was assigned when a scratch is observed.

(Light Resistance Test)

As a reliability test of the optical film, the optical films which include the obtained colored layers were each subjected to a moist heat resistance test in which a test is performed for 120 hours under the conditions of a xenon lamp illuminance of 60 $W/cm^2$ (300 to 400 nm), a tester chamber temperature of 45° C. and humidity of 50% RH, using a xenon weather meter tester (X75, manufactured by Suga Test Instruments Co., Ltd.). The transmittance was measured before and after the test using an automatic spectrophotometer (U-4100, manufactured by Hitachi, Ltd.) to calculate transmittance difference $\Delta t\lambda$ between before and after the test at wavelength $\lambda$ that exhibits the smallest transmittance in the absorption wavelength ranges of the first coloring material to the third coloring material and color difference $\Delta E^*ab$ with illuminant C between before and after the test. The transmittance difference and color difference are good when closer to zero and preferably achieve $\Delta E^*ab \leq 5$.

[Characteristic Evaluation of Display Device]

In Examples 8 to 11 and Comparative Examples 7 to 10 below, display device characteristics were evaluated by simulation in the following manner for display devices which include the obtained optical films 8, 10, 11, and 18 to 21. In the simulation, the display devices were each configured such that the optical film was bonded to an OLED display device (object).

It is noted that the OLED display device as an object to have the optical film bonded has a spectrum during white display illustrated in FIG. 6 and individual spectra during red display, green display, and blue display illustrated in FIG. 7.

(Transmission Characteristics (Transmission Characteristics of White Display))

The transmittance of the obtained optical film was measured using an automatic spectrophotometer (U-4100, manufactured by Hitachi, Ltd.). This transmittance of the optical film was multiplied by the single spectrum (illustrated in FIG. 6) during white display of the OLED display device without transmission through the optical film to calculate a spectrum after transmission through the optical film. The single spectrum during white display of the OLED display device and the spectrum after passing through the optical film were each multiplied by the luminous efficiency function to calculate a Y value. A ratio when the Y value obtained from the single spectrum during white display of the OLED display device is 100 was defined as the efficiency, which was evaluated as an indication of the transmission characteristics of the display device.

(Color Reproducibility)

The transmittance of the obtained optical film was measured using an automatic spectrophotometer (U-4100, manufactured by Hitachi, Ltd.). This transmittance of the optical film was multiplied by the individual spectra (illustrated in FIG. 7) during red display, green display, and blue display of the OLED display device without transmission through the optical film to calculate respective chromaticities (X,Y) of red, green, and blue single colors according to the CIE (Commission International del'Eclairage) 1931 color system after transmission through the optical film. Next, a triangle obtained by connecting the obtained chromaticities of red, green, and blue single colors is compared to each of a triangle connecting three primary colors of red (X=0.680, Y=0.320), green (X=0.265, Y=0.690), and blue (X=0.150, Y=0.060) of DCI-P3 proposed by the DCI (Digital Cinema Initiatives) and a triangle connecting three primary colors of red (X=0.640, Y=0.330), green (X=0.210, Y=0.710), and blue (X=0.150, Y=0.060) of the Adobe RGB standard proposed by Adobe Systems Incorporated (refer to JP 2011-17963A). The overlapping area was obtained to calculate the coverage ratio of each standard, which was evaluated as an indication of color reproducibility.

As optical film characteristic evaluation for the optical films 1 to 17 illustrated in Tables 1 and 2, results of tests on ultraviolet shielding rate, pencil hardness, and light resistance of the ultraviolet shielding layer (ultraviolet absorption layer) are illustrated in Tables 7 and 8.

TABLE 7

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Optical film | Optical film 1 | Optical film 2 | Optical film 3 | Optical film 4 | Optical film 5 | Optical film 6 | Optical film 7 | Optical film 8 | Optical film 9 | Optical film 10 | Optical film 11 |
| UV absorption layer | Hardcoat layer 1 | Hardcoat layer 1 | Anti-glare layer 1 | Anti-glare layer 1 | Anti-glare layer 1 | Hardcoat layer 1 | Hardcoat layer 1 | Hardcoat layer 1 | Hardcoat layer 1 | Hardcoat layer 1 | Hardcoat layer 1 |
| UV shielding rate | 90.5% | 90.5% | 90.4% | 90.4% | 90.4% | 90.5% | 90.5% | 90.5% | 90.5% | 90.5% | 90.5% |
| Pencil hardness | OK | OK | OK | OK | OK | OK | OK | OK | OK | OK | OK |
| Light Resistance of ΔTλ | 13.5 | 13.0 | 12.8 | 13.0 | 13.2 | 12.2 | 9.5 | 8.0 | 6.4 | 10.4 | 5.2 |

TABLE 7-continued

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Colored layer | ΔE Ab | 3.6 | 3.6 | 3.6 | 3.6 | 3.6 | 3.5 | 2.9 | 2.7 | 1.5 | 4.0 | 0.8 |

TABLE 8

| | | Comparative Example 1 | Comparative Example 2 | Comparative Example 3 | Comparative Example 4 | Comparative Example 5 | Comparative Example 6 |
|---|---|---|---|---|---|---|---|
| Optical film | | Optical film 12 | Optical film 13 | Optical film 14 | Optical film 15 | Optical film 16 | Optical film 17 |
| UV absorption layer | | — | — | — | Hardcoat layer 3 | — | — |
| UV shielding rate | | — | — | — | 90.5% | — | — |
| Pencil hardness | | OK | OK | OK | Poor | OK | OK |
| Light resistance of colored layer | ΔT λ | 65.9 | 65.4 | 67.0 | 13.5 | 18.1 | 42.0 |
| | ΔEab | 12.6 | 12.5 | 13.0 | 3.6 | 5.2 | 8.5 |

The optical films of Examples 1 to 11 each include a colored layer and an optical function layer that is disposed on a side above the colored layer and has ultraviolet absorption properties. Also, as illustrated in Tables 7 and 8, the optical function layer that is disposed on a side above the colored layer and has ultraviolet absorption properties has an ultraviolet shielding rate of 85% or more.

From the results in Tables 7 and 8, the optical film (Examples 1 to 11) including the colored layer in the present invention included, as a layer above the colored layer, a layer having ultraviolet absorption properties, so that the light resistance of the colored layer was significantly improved, compared to when ultraviolet absorption properties are not provided as in Comparative Examples 1, 2, 5, and 6 or when ultraviolet absorption properties are provided in the colored layer as in Comparative Example 3. Also, as understood from the result of Comparative Example 3, it is difficult to improve light resistance even when an ultraviolet absorber is added to the colored layer. In this manner, ultraviolet absorption properties have only a small effect when provided to the colored adhesive layer, and another layer needs to be provided as the upper layer.

Light resistance was further improved by further laminating an oxygen barrier layer or by containing, in the colored layer, a hindered amine photostabilizer having a high molecular weight as the radical scavenger and/or a dialkyl dithiocarbamate nickel complex as the singlet oxygen quencher. It is noted that from the results of the light resistance of the optical films that include the colored layers 2, 3, and 5, it is understood that the hindered amine photostabilizer and the singlet oxygen quencher may be added either singly or in combination.

In all examples, the pencil hardness is determined to be "OK". Also, in Comparative Example 4 including the hardcoat layer 3, the pencil hardness is determined to be "Poor". It is considered that this is because the absorption wavelength peak of the initiator in the hardcoat layer 3 overlapped with the absorption wavelength of the ultraviolet absorber.

Although the hardcoat layer 1 or the anti-glare layer 1 contained in Examples 1 to 11 is an ultraviolet shielding layer (ultraviolet absorption layer) formed with an active energy ray-curing resin that contains an ultraviolet absorber, ultraviolet shielding properties and hardness were mutually compatible by displacing the absorption wavelength bands of the ultraviolet absorber and the photoinitiator from each other.

As characteristic evaluation of display devices including the optical films 8, 10, 11, and 18 to 21, results of simulation on white display transmission characteristics and color reproducibility are illustrated in Table 9.

TABLE 9

| | Example 8 | Example 10 | Example 11 | Comparative Example 7 | Comparative Example 8 | | Comparative Example 9 | Comparative Example 10 |
|---|---|---|---|---|---|---|---|---|
| Optical film | Optical film 8 | Optical film 10 | Optical film 11 | Optical film 18 | Optical film 19 | | Optical film 20 | Optical film 21 |
| Maximum absorption wavelength (T < 50%) | 493 nm | 800 nm | 595 nm | — | 493 nm | 589 nm | 545 nm | 575 nm |
| Transmittance @maximum absorption wavelength (T < 50%) | 26.3% | 11.2% | 23.2% | — | 26.3% | 19.5% | 48.1% | 48.4% |
| White display characteristic evaluation | 75 | 70 | 77 | 92 | 61 | | 75 | 73 |

TABLE 9-continued

| | | Example 8 | Example 10 | Example 11 | Comparative Example 7 | Comparative Example 8 | Comparative Example 9 | Comparative Example 10 |
|---|---|---|---|---|---|---|---|---|
| Color reproducibility evaluation | DCI coverage ratio | 92% | 91% | 90% | 88% | 94% | 88% | 89% |
| | Adobe RGB coverage ratio | 91% | 92% | 96% | 93% | 98% | 89% | 96% |

From the results of Table 9, a display device having bonded thereto the optical film including the colored layer in the present invention had a DCI standard coverage ratio of 90% or more and color reproducibility that was improved compared to Comparative Example 7 which includes no colored layer. Especially in Example 8 having large absorption in the wavelength band of the first coloring material, the DCI chromaticity coverage ratio was also significantly improved. Also, in Comparative Example 8 having deep absorption in a plurality of wavelength ranges of the first coloring material and the second coloring material, white display transmission characteristics are low. This means that when multiple types of coloring materials are contained in the colored layer, it is preferable that the transmittance is 1% or more and less than 50% at the maximum absorption wavelength of only one of the maximum absorption wavelengths of the coloring materials. Also, in Comparative Examples 9 and 10 including a coloring material of which the wavelength range and half width do not meet the requirements, color reproducibility evaluation is low. In contrast to these, in Examples 8 to 11, it was demonstrated that white display transmission characteristics are excellent while exhibiting a certain color correction function.

Embodiments of the present invention have been described in detail with reference to the drawings. However, specific structures are not limited to these embodiments. The present invention should encompass modifications, combinations, or the like of these structures, in a range that does not depart from the spirit of the present invention.

For example, the optical film has only to include a colored layer 30 and an optical function layer 20 that is formed on a side above the colored layer 30 and contains a layer (ultraviolet shielding layer) having ultraviolet absorption properties. The layer having ultraviolet absorption properties may be the hardcoat layer 21 or the anti-glare layer 23. Also, the anti-glare layer 23 may contain the resin described as an example for the composition of the hardcoat layer 21 in the first embodiment. That is, the optical function layer 20 may have the cured film of the composition that contains an energy ray-curing compound, a photoinitiator, and an ultraviolet absorber, which has been described in the first embodiment.

In this structure, the optical function layer 20 has an ultraviolet shielding rate in accordance with JIS L 1925 of 85% or more and a pencil hardness at a surface load of 500 g of H or above. This can enhance the scratch resistance of the optical film while preventing degradation of the coloring material contained in the colored layer 30.

For example, an additional layer may be provided to the optical film of the present invention in order to impart a desired function. Examples of such an additional layer include an anti-static layer and an anti-fouling layer. Also, an anti-static agent may be added to any layer of the optical function layer 20 of the optical film in order to impart anti-static properties. A material having water and/or oil repellency may be contained in any layer of the optical function layer 20 in order to impart anti-fouling properties.

[Reference Signs List]1, 1A, 1B, 1C, 1D Optical film; 10 Substrate (transparent substrate); 10*a* First surface; 10*b* Second surface; 20 Optical function layer; 21 Hardcoat layer; 22 Low refractive index layer; 23 Anti-glare layer; 30 Colored layer; 40 Oxygen barrier layer.

What is claimed is:

1. An optical film, comprising:

a sheet-like transparent substrate having a first surface and a second surface opposite the first surface;

a colored layer that is formed to face the first surface of the transparent substrate and contains a colorant; and an optical function layer formed on the colored layer, wherein the colorant contains at least one of a first coloring material having a maximum absorption wavelength in a range of 470 to 530 nm and an absorption spectral half width of 15 to 45 nm, a second coloring material having a maximum absorption wavelength in a range of 560 to 620 nm and an absorption spectral half width of 15 to 55 nm, and a third coloring material in which a wavelength having the lowest transmittance in a wavelength range of 400 to 800 nm is in a range of 650 to 800 nm, in one of absorption wavelength bands of the colorant, a transmittance is 1% or more and less than 50%, the optical function layer includes a layer that has an ultraviolet shielding rate according to JIS L 1925 of 85% or more and a pencil hardness at a surface load of 500 g of H or above, and ΔE*ab, which is a chromaticity difference between before and after a light resistance test of irradiating for 120 hours with a xenon lamp having an illuminance at wavelengths of 300 to 400 nm of 60 $W/cm^2$ under the conditions of a temperature of 45° C. and a humidity of 50% RH, satisfies Equation (1) below:

ΔE*ab≤5 Equation (1), wherein the second coloring material is a metal complex of a compound having a tetraazaporphyrin structure.

2. The optical film of claim 1, wherein the colored layer contains at least one of a radical scavenger, a peroxide decomposer, and a singlet oxygen quencher.

3. The optical film of claim 2, wherein the radical scavenger is a hindered amine photostabilizer having a molecular weight of 2,000 or more.

4. The optical film of claim 2, wherein the singlet oxygen quencher is a transition metal complex of dialkyl phosphate, dialkyl dithiocarbamate, or benzene dithiol or similar dithiol.

5. The optical film of any claim 1, wherein the optical function layer includes an oxygen barrier layer having oxygen barrier properties in which an oxygen permeability is 10 cc/($m^2$·day·atm) or less.

6. The optical film of claim 1, wherein the optical function layer includes an ultraviolet shielding layer constituted by a cured film of a composition that contains an energy radiation-curing compound, a photoinitiator, and an ultraviolet absorber, an absorption wavelength region in an ultraviolet region of the photoinitiator is different from an absorption wavelength region in an ultraviolet region of the ultraviolet absorber, and the absorption wavelength region in the ultraviolet region of the ultraviolet absorber is in a range of 290 to 370 nm.

7. The optical film of claim 1, wherein the optical function layer includes an ultraviolet shielding layer constituted by a cured film of a composition that contains an energy radiation-curing compound, a photoinitiator, and an ultraviolet absorber, and the optical function layer includes, sequentially from a side facing the colored layer, the ultraviolet shielding layer and a low refractive index layer having a refractive index lower than that of the ultraviolet shielding layer.

8. The optical film of claim 1, wherein the optical function layer includes an ultraviolet shielding layer constituted by a cured film of a composition that contains an energy radiation-curing compound, a photoinitiator, and an ultraviolet absorber, and the optical function layer includes, sequentially from a side facing the colored layer, the ultraviolet shielding layer and an anti-glare layer.

9. The optical film of claim 1, wherein the optical function layer includes an ultraviolet shielding layer constituted by a cured film of a composition that contains an energy radiation-curing compound, a photoinitiator, and an ultraviolet absorber, and the ultraviolet shielding layer is an anti-glare layer that contains an ultraviolet absorber.

10. The optical film of claim 1, wherein the optical function layer includes an ultraviolet shielding layer constituted by a cured film of a composition that contains an energy radiation-curing compound, a photoinitiator, and an ultraviolet absorber, the optical function layer includes, sequentially from a side facing the colored layer, the ultraviolet shielding layer and a low refractive index layer having a refractive index lower than that of the ultraviolet shielding layer, and the ultraviolet shielding layer is an anti-glare layer that contains an ultraviolet absorber.

11. The optical film of claim 1, wherein each of the first coloring material and the third coloring material is a compound having a structure selected from the group consisting of porphyrin structure, merocyanine structure, phthalocyanine structure, azo structure, cyanine structure, squarylium structure, coumarin structure, polyene structure, quinone structure, tetraazaporphyrin structure, pyrromethene structure, and indigo structure, or a metal complex thereof.

12. A display device, comprising:

a light source; and the optical film of claim 1 disposed in such a manner that the second surface of the transparent substrate faces the light source.

13. The optical film of claim 1, wherein the second coloring material is a tetraazaporphyrin copper complex dye.

* * * * *